US010492167B2

(12) United States Patent
Ozturk et al.

(10) Patent No.: US 10,492,167 B2
(45) Date of Patent: Nov. 26, 2019

(54) ENHANCED SYSTEM ACCESS FOR E-UTRAN

(71) Applicant: QUALCOMM Incorporated, San Diego, CA (US)

(72) Inventors: Ozcan Ozturk, San Diego, CA (US); Jun Wang, Poway, CA (US); Madhavan Srinivasan Vajapeyam, San Diego, CA (US); Ravindra Manohar Patwardhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 14/962,468

(22) Filed: Dec. 8, 2015

(65) Prior Publication Data

US 2016/0165638 A1 Jun. 9, 2016

Related U.S. Application Data

(60) Provisional application No. 62/089,664, filed on Dec. 9, 2014.

(51) Int. Cl.
*H04W 74/00* (2009.01)
*H04W 74/08* (2009.01)
(Continued)

(52) U.S. Cl.
CPC .............. *H04W 68/02* (2013.01); *H04W 8/22* (2013.01); *H04W 48/12* (2013.01)

(58) Field of Classification Search
None
See application file for complete search history.

(56) References Cited

U.S. PATENT DOCUMENTS 7,764,969 B2 7/2010 Ananthanarayanan et al.
8,249,004 B2 * 8/2012 Wang .................... H04L 5/0091 370/329

(Continued)

FOREIGN PATENT DOCUMENTS

CN 1767686 A 5/2006
CN 101228728 A 7/2008

(Continued)

OTHER PUBLICATIONS

Partial International Search Report—PCT/US2015/064754—ISA/EPO—dated Mar. 22, 2016.

(Continued)

*Primary Examiner* — Steve R Young
(74) *Attorney, Agent, or Firm* — Patterson & Sheridan, LLP

(57) ABSTRACT

Certain aspects relate to methods and apparatus for wireless communications, comprising determining to use a reduced paging cycle to page a user equipment (UE) of a first type that supports the reduced paging cycle, the reduced paging cycle having a shorter period relative to a paging cycle used with UEs of a second type which do not support the reduced paging cycle, and paging the UE of the first type in accordance with the reduced paging cycle. Certain aspects relate to methods and apparatus for conveying system information by a base station, comprising broadcasting a first system information common to each cell of a group of cells in an area and broadcasting a second system information that can vary between cells in the group of cells, wherein the second system information is broadcast more frequently than the first system information.

21 Claims, 12 Drawing Sheets

(51) Int. Cl.

| | |
|---|---|
| ***H04W 68/02*** | (2009.01) |
| *H04W 8/22* | (2009.01) |
| *H04W 48/12* | (2009.01) |

(56) References Cited

U.S. PATENT DOCUMENTS

| | | | | |
|---|---|---|---|---|
| 9,088,971 | B2 * | 7/2015 | Anderson | H04W 72/04 |
| 9,374,847 | B2 * | 6/2016 | Lindoff | H04W 24/02 |
| 2005/0014519 | A1 * | 1/2005 | Sinnarajah | H04W 68/00 455/458 |
| 2007/0207788 | A1 * | 9/2007 | Phan | H04W 74/0866 455/414.4 |
| 2010/0067496 | A1 * | 3/2010 | Choi | H04W 52/54 370/336 |
| 2010/0105449 | A1 * | 4/2010 | Shi | H04W 52/0248 455/574 |
| 2011/0134888 | A1 * | 6/2011 | Lin | H04W 68/00 370/335 |
| 2012/0058764 | A1 | 3/2012 | Kang et al. | |
| 2012/0195275 | A1 * | 8/2012 | Ghaus | H04W 28/26 370/329 |
| 2014/0094201 | A1 * | 4/2014 | Knauft | H04W 68/12 455/458 |
| 2017/0118738 | A1 * | 4/2017 | Axmon | H04W 68/02 |

FOREIGN PATENT DOCUMENTS

| | | | |
|---|---|---|---|
| EP | 2930998 | A1 | 10/2015 |
| WO | 2007095503 | A1 | 8/2007 |
| WO | WO-2014089985 | A1 | 6/2014 |

OTHER PUBLICATIONS

Siemens: "Adaptive DRX Setting for LTE paging", 3GPP TSG-RAN WG2#55; R2-062818; Seoul, Korea, Oct. 9-3, 2006; Agenda item: 16; Internet Citation, Oct. 13, 2006 (Oct. 13, 2006), XP002434318, Retrieved from the Internet: URL:http://www.3gpp.org/ftp/tsg_ran/WG2_RL2/TSGR2_55/Documents [retrieved on May 21, 2007].

International Search Report and Written Opinion—PCT/US2015/064754—ISA/EPO—dated Jun. 6, 2016.

Siemens: "Adaptive DRX Setting for LTE Paging", 3GPP Draft, R2-062818, 3rd Generation Partnership Project (3GPP), Mobile Competence Centre, 650, Route Des Lucioles, F-06921 Sophia-Antipolis Cedex, France, vol. RAN WG2, No. Seoul, Korea, Oct. 5, 2006, Oct. 5, 2006 {Oct. 5, 2006), XP050132343, pp. 2, the whole document.

* cited by examiner

ENHANCED SYSTEM ACCESS FOR E-UTRAN

CROSS-REFERENCE TO RELATED APPLICATION

This application claims priority to U.S. Provisional Patent Application No. 62/089,664, filed on Dec. 9, 2014, which is hereby expressly incorporated by reference in its entirety.

BACKGROUND

Field

Certain aspects of the present disclosure generally relate to wireless communications systems and, more specifically, to enhanced procedures for accessing such systems.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. A base station may transmit data and control information on the downlink to a UE and/or may receive data and control information on the uplink from the UE.

Current procedures for accessing a base station involve a relatively large latency between the time a UE initiates and actually gains access. Reducing this latency is desirable.

SUMMARY

Certain aspects of the present disclosure provide a conveying system information by a base station. The method generally includes broadcasting a first system information common to each cell of a group of cells in an area; and broadcasting a second system information that can vary between cells in the group of cells, wherein the second system information is broadcast more frequently than the first message.

Certain aspects of the present disclosure provide a method for obtaining system information by a user equipment (UE). The method generally includes receiving a broadcast of a first system information common to each cell of a group of cells in an area, and receiving a broadcast of second system information that can vary between cells in the group of cells, wherein the second system information is broadcast more frequently than the first system information.

Certain aspects of the present disclosure provide a method for wireless communication. The method generally includes determining to use a reduced paging cycle to page a user equipment (UE) of a first type that supports the reduced paging cycle, the reduced paging cycle having a shorter period relative to a paging cycle used with UEs of a second type which do not support the reduced paging cycle, and paging the UE in accordance with the reduced paging cycle.

Certain aspects of the present disclosure provide a method for wireless communications by a user equipment (UE). The method generally includes signaling a capability of the UE to support use of a reduced paging cycle, the reduced paging cycle having a shorter period relative to a paging cycle used by UEs of a second type which do not support the reduced paging cycle and receiving a page from a base station in accordance with the reduced paging cycle.

Various other aspects provide apparatus, systems and computer program products for performing the operations described above. Various aspects and features of the disclosure are described in further detail below.

DETAILED DESCRIPTION

Certain aspects of the present disclosure provide techniques that may allow for reductions in latency for cell access procedures. Example procedures where latency in LTE cell access procedures may be reduced include cell acquisition and paging.

Cell acquisition generally refers to synchronization and acquiring system information from an eNB. Aspects of the present disclosure provide a tiered approach to conveying system information, for example, where certain common system information is transmitted with a first periodicity, while other system information is transmitted more often, which may reduce latency.

Cell paging generally involves a paging cycle where a UE monitors for paging messages sent to the UE periodically, at determined times. Aspects of the present disclosure also provide techniques for enhancing paging procedures, which may also reduce latency.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
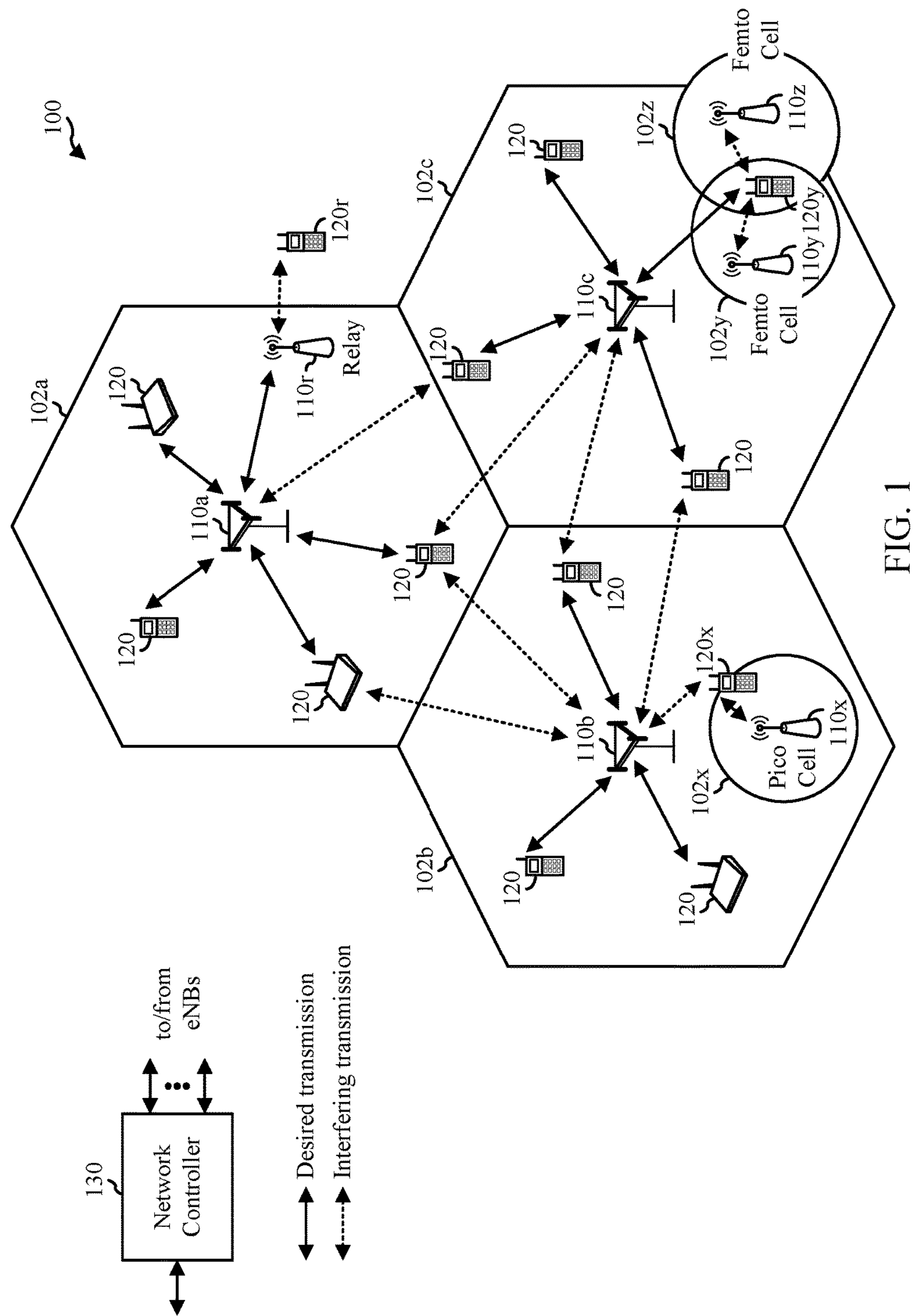
FIG. 1 illustrates an example of a wireless communications network, in which aspects of the present disclosure may be practiced.

FIG. 1 shows a wireless communication network 100 (e.g., an LTE network), in which the techniques described herein may be practiced. For example, the techniques may be utilized to reduce latency when UEs 120 perform various access procedures with eNBs 110.

The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. The term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110*a*, 110*b*, and 110*c* may be macro eNBs for macro cells 102*a*, 102*b*, and 102*c*, respectively. eNB 110*x* may be a pico eNB for a pico cell 102*x*. eNBs 110*y* and 110*z* may be femto eNBs for femto cells 102*y* and 102*z*, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110*r* may communicate with eNB 110*a* and a UE 120*r* in order to facilitate communication between eNB 110*a* and UE 120*r*. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

A UE may be within the coverage of multiple eNBs. One of these eNBs may be selected to serve the UE. The serving eNB may be selected, for example, based on various criteria such as received power, received quality, path loss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120*y* may be close to femto eNB 110*y* and may have high received power for eNB 110*y*. However, UE 120*y* may not be able to access femto eNB 110*y* due to restricted association and may then connect to macro eNB 110*c* with lower received power (as shown in FIG. 1) or to femto eNB 110*z* also with lower received power (not shown in FIG. 1). UE 120*y* may then observe high interference from femto eNB 110*y* on the downlink and may also cause high interference to eNB 110*y* on the uplink.

A dominant interference scenario may also occur due to range extension, which is a scenario in which a UE connects to an eNB with lower path loss and lower SNR among all eNBs detected by the UE. For example, in FIG. 1, UE 120*x* may detect macro eNB 110*b* and pico eNB 110*x* and may have lower received power for eNB 110*x* than eNB 110*b*. Nevertheless, it may be desirable for UE 120*x* to connect to pico eNB 110*x* if the path loss for eNB 110*x* is lower than the path loss for macro eNB 110*b*. This may result in less interference to the wireless network for a given data rate for UE 120*x*. However, in certain cases, being served by the pico eNB 110*x* while in a cell range expansion (CRE) region of the pico eNB 110*x* may not provide much benefit and in fact may lead to service interruption. In accordance with certain aspects of the present disclosure, the UE 120*x* may avoid being served by the pico eNB 110*x*, in response to detecting certain conditions including high Doppler, high relative timing/frequency offset, processing limitations, and low battery power. These aspects are discussed in detail below.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the relative received power of signals from the eNB received at a UE (e.g., and not based on the transmit power level of the eNB).

Figure 2:
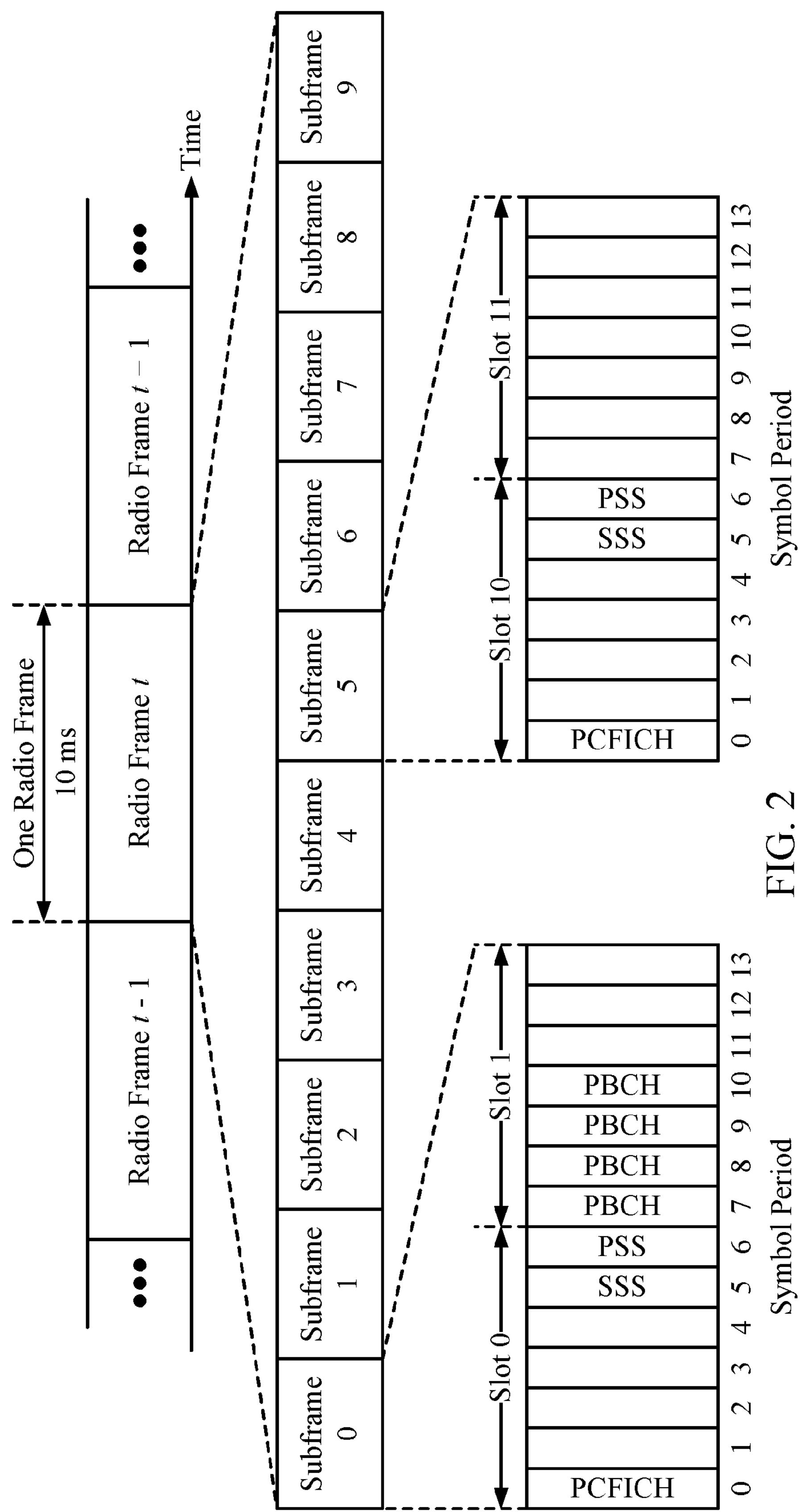
FIG. 2 illustrates an example of a frame structure in a wireless communications network.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP), as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
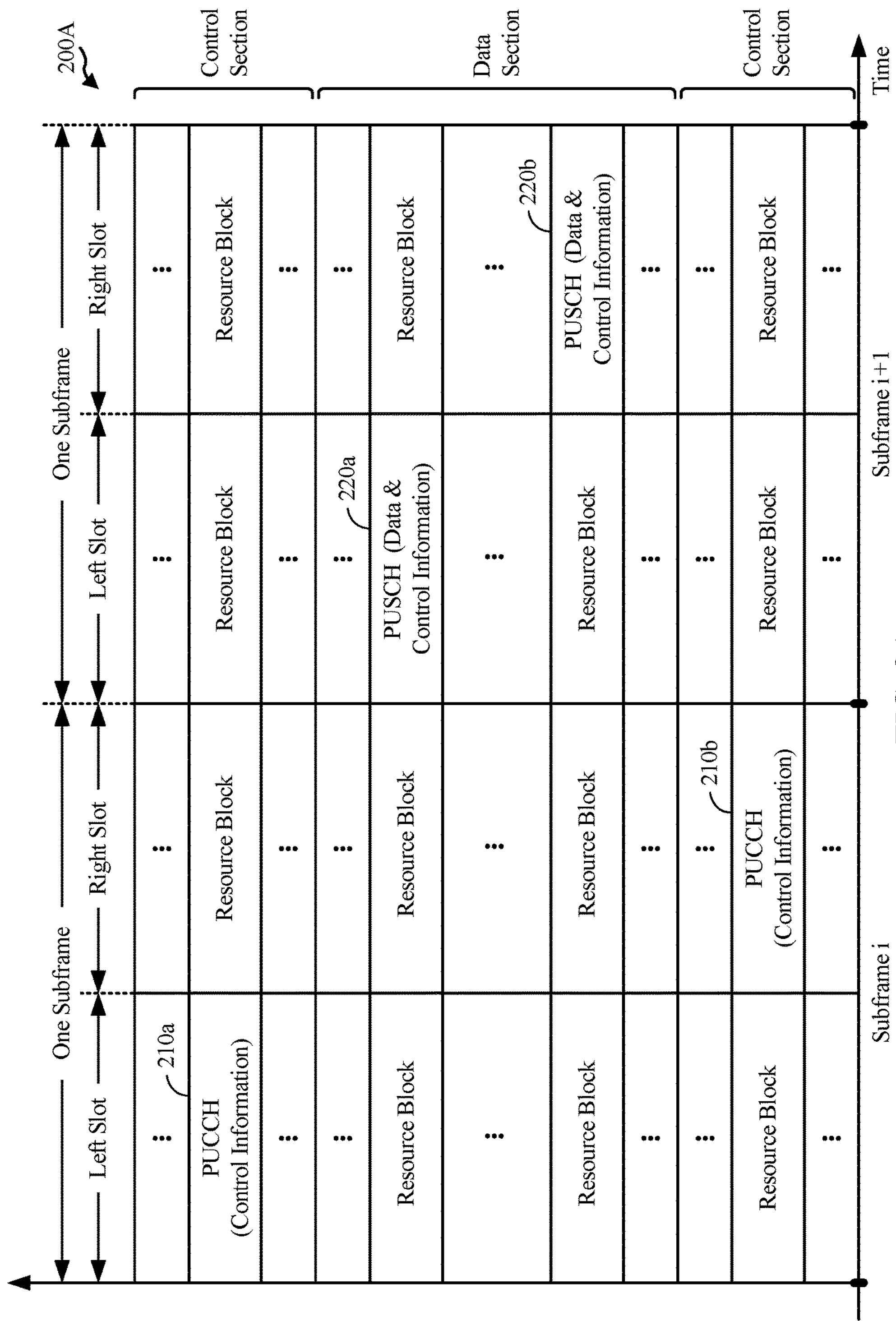
FIG. 2A illustrates an example format for the uplink in Long Term Evolution (LTE).

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210*a*, 210*b* on the assigned resource blocks in the control section. The UE may transmit data or both data and control information in a Physical Uplink Shared Channel (PUSCH) 220*a*, 220*b* on the assigned resource blocks in the data section. An uplink transmission may span both slots of a subframe and may hop across frequency as shown in FIG. 2A.

Figure 3:
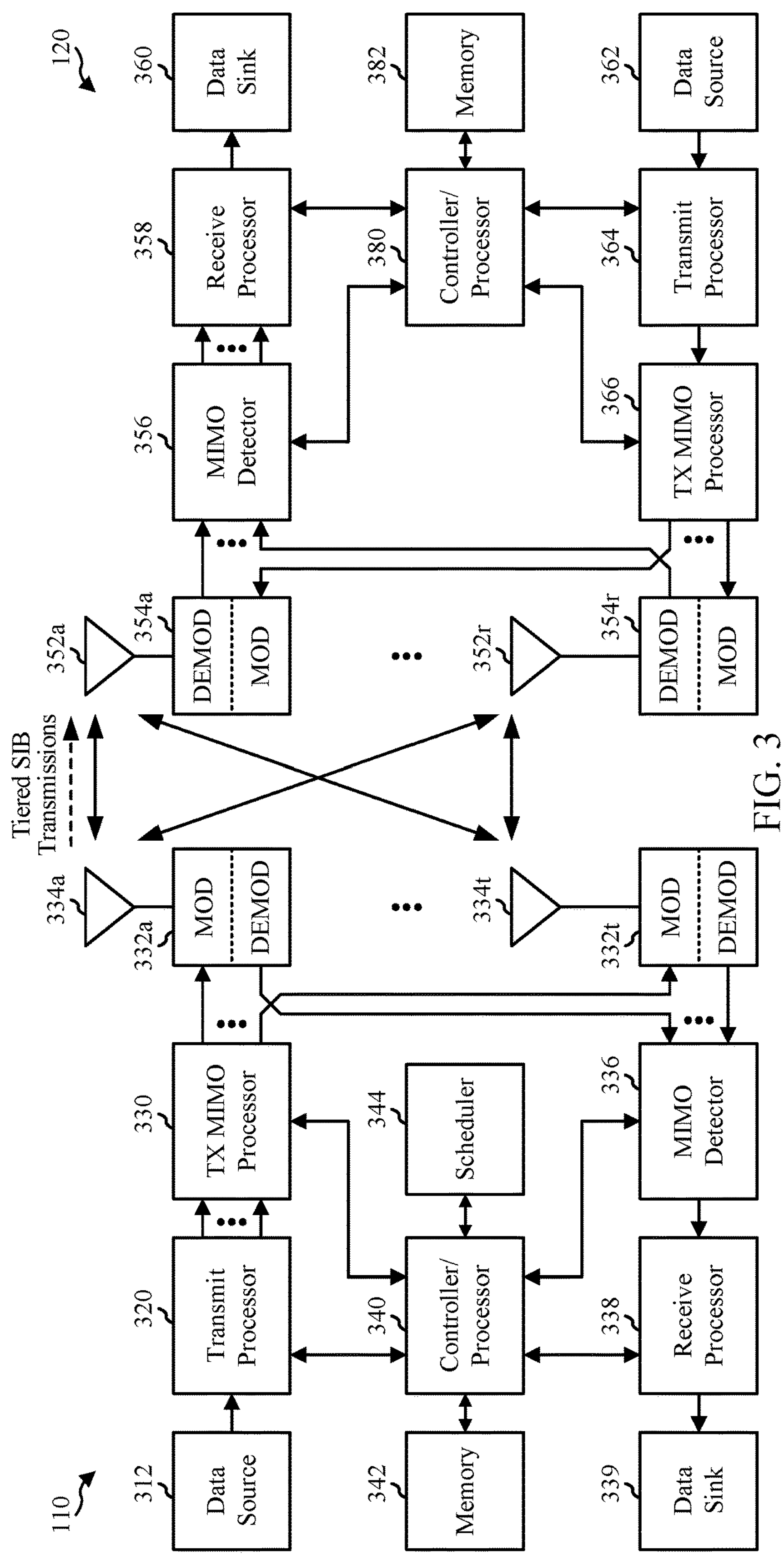
FIG. 3 illustrates an example of an enhanced Node B in communication with a user equipment device (UE) in a wireless communications network, in accordance with certain aspects of the present disclosure.

FIG. 3 shows a block diagram of a design of a base station or an eNB 110 and a UE 120, which may be one of the base stations/eNBs and one of the UEs in FIG. 1. eNB 110 and UE 120 may be configured to perform operations described herein. For example, as illustrated, eNB 110 may be configured to convey system information to UE 120 in a tiered manner. As will be described in greater detail below, the tiered approach may involve transmitting a set of common system information (common to a group of cells) with a first periodicity and transmitting a set of cell-specific system information more frequently.

For a restricted association scenario, the eNB 110 may be macro eNB 110*c* in FIG. 1, and UE 120 may be UE 120*y*. The eNB 110 may also be a base station of some other type. The eNB 110 may be equipped with T antennas 334*a* through 334*t*, and the UE 120 may be equipped with R antennas 352*a* through 352*r*, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332*a* through 332*t*. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332*a* through 332*t* may be transmitted via T antennas 334*a* through 334*t*, respectively.

At the UE 120, antennas 352*a* through 352*r* may receive the downlink signals from the eNB 110 and may provide received signals to demodulators (DEMODs) 354*a* through 354*r*, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354*a* through 354*r*, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354*a* through 354*r* (e.g., for SC-FDM, etc.), and transmitted to the eNB 110. At the eNB 110, the uplink signals from the UE 120 may be received by antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340, 380 may direct the operation at the eNB 110 and the UE 120, respectively. The controller/processor 380 and/or other processors and modules at the UE 120 may perform or direct operations 600 shown in FIG. 6 and/or operations 1100 shown in FIG. 11, and/or other processes for the techniques to enhance system access for E-UTRAN, as described herein. The controller/processor 340 and/or other processors and modules at eNB 110 may perform or direct operations 500 shown in FIG. 5 and/or operations 1000 shown in FIG. 10, and/or other processes for the techniques to enhance system access for E-UTRAN, as described herein. The memories 342 and 382 may store data and program codes for eNB 110 and UE 120, respectively. A scheduler 344 may schedule UEs for data transmission on the downlink and/or uplink.

Enhanced System Access

As noted above, certain aspects of the present disclosure provide techniques that may allow for reductions in system access latency, for example, when acquiring synchronization and system information. Certain aspects of the present disclosure may allow for reductions in latency associated with paging. Such improvements to paging procedures may allow a UE to make faster transitions from Idle Mode to, for example, connected mode.

According to certain aspects, latency during cell acquisition may be reduced by reducing the primary synchronization signal (PSS) periodicity, currently 5 ms for LTE systems, to less than 5 ms. During a cell search (e.g., after power on), a UE attempts to acquire and synchronize with a cellular network by acquiring the PSS signal broadcasted by an eNB. The UE may then acquire the secondary synchronization signal (SSS), based on the PSS as the SSS symbols are located in the same subframe as the PSS but in the symbol before the PSS.

The PSS is currently located in the last OFDM symbol of first time slot of the first subframe (subframe 0) of radio frame and is repeated in subframe 5. As each subframe is 1 ms, the current transmission time interval (TTI) of the PSS/SSS is 5 ms. This PSS/SSS duration may be reduced so the PSS/SSS is broadcast more often. One such reduced duration may include a TTI of the PSS/SSS of 2.5 ms.

Such timing would allow UEs which support such reduced latency during cell acquisition to obtain the PSS/SSS signals faster than legacy UEs (monitoring for PSS transmitted with 5 ms TTI), while remaining backward compatible with current (legacy) timing. Similarly, an eNB transmitting PSS at this new periodicity would remain backward compatible with (and detectable by) legacy UEs. Enabling this TTI reduction may be accomplished, for example, by scaling PHY and MAC timing or with a different overall subframe timing than that currently used for LTE.

In certain aspects, latency during cellular acquisition may be reduced by reducing the Master Information Block (MIB) periodicity. During cell acquisition, the UE detects and reads the MIB to acquire information necessary for camping on a cell. This information may include channel bandwidth information, system frame number (SFN), and physical channel hybridARQ indicator channel (PHICH) configuration information.

For current implementations, a new MIB is broadcast every radio frame, which has a duration of 10 ms, for which the SFN mod 4 is equal to 0, for a 40 ms periodicity. Copies of the MIB are broadcast every radio frame for a 10 ms periodicity. This MIB periodicity may be reduced so the new MIB and copies of the MIB may be broadcast more often. One such reduced duration may include a new MIB broadcast periodicity of 20 ms and a copy of the MIB periodicity of 5 ms. As with a reduced TTI for PSS/SSS noted above, this reduced duration may be accomplished by scaling PHY and MAC timing, or with a different overall subframe timing than that currently used for LTE.

Another option for reducing latency during cell acquisition is to combine information blocks, such as the MIB and system information block 1 (SIB1), in one message. During cell acquisition, the UE also detects and reads the SIB1. SIB1 broadcasts contain information common to all UEs in the cell related to cell access parameters as well as information related to the scheduling of other system information blocks. In current implementations, the SIB1 is broadcast in subframe number 5 of the SFN where the SFN mod 8 is equal to 0. Copies of the SIB1 may be repeated in subframe number 5 of the SFN where the SFN mod 2 is equal to 0. In order to reduce the time needed for a UE to receive the SIB1, the SIB1 may be broadcast in the same message as the MIB.

In a similar manner, latency during cell acquisition may be reduced by combining the SIB1 and system information block 2 (SIB2) in one message. A MIB, SIB1 and SIB2 are needed for a UE to acquire and camp on a cell and during cell acquisition, the UE also detects and reads the SIB2. SIB2 broadcasts contain the radio resource configuration information which is common for all UEs such as random access channel related parameters, idle mode paging configurations, uplink physical control channel (PUCCH) and uplink shared channel (PUSCH) configurations. While a SIB1 is broadcast on a regular schedule, the SIB2 is broadcast on a schedule described in the SIB1. As the UE must receive and decode the SIB1 in order to obtain the SIB2 timing and then wait for the specified time to listen for the SIB2, a significant amount of time may be spent acquiring the information contained in the SIB1 and SIB2. This latency may be reduced by combining the SIB1 and SIB2 messages into a single combined message.

As noted above, another option for reducing latency during cell acquisition is to convey system information in a tiered manner. For example, FIG. 4 conceptually illustrates an example 400 of tiered SIB transmissions. As shown in the illustrated example, common (or base) information may be transmitted with a first periodicity (e.g., every 5 subframes as shown), while dynamic SIB information may be transmitted more frequently (e.g., every subframe). In some cases, the common SIB information may be common to a set of eNBs (e.g., for a defined set of neighboring cells), while the dynamic information may differ for each cell.

This approach of tiered SIB transmission may help reduce latency during cell acquisition. As noted above, currently both the SIB1 and SIB2 broadcasts may contain information common to all UEs in the cell. In certain aspects, information contained in the SIB1 and SIB2 may be divided into information common to an area of cells and information specific to individual cells.

Figure 4:
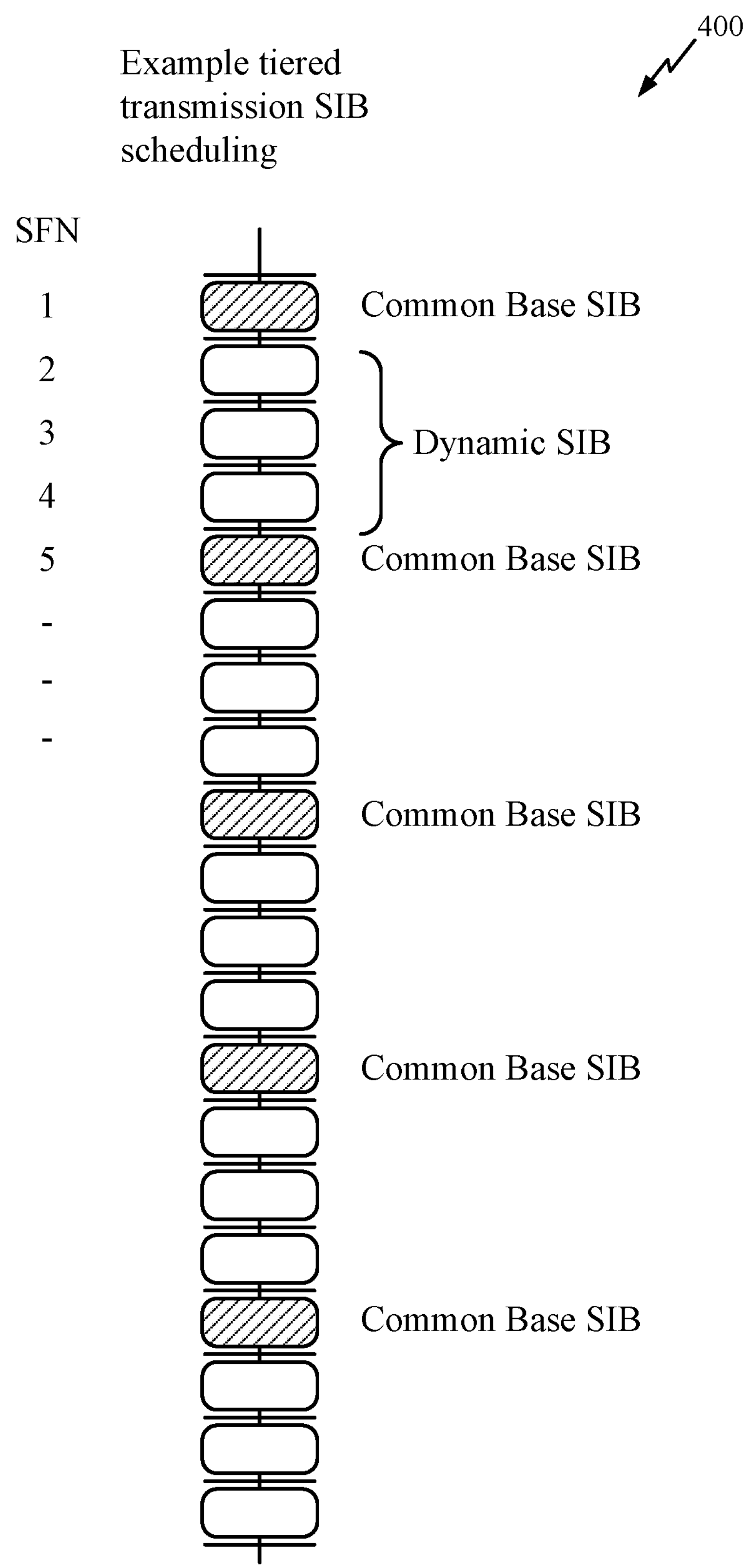
FIG. 4 conceptually illustrates an example of tiered transmission SIB scheduling, in accordance with certain aspects of the present disclosure.

Information common to a collection of cells an area may be grouped into a semi-static base SIB (e.g., Common SIB shown in FIG. 4) and cell specific information, such as that associated with a single cell, may be grouped into a dynamic SIB (e.g., Dynamic SIB shown in FIG. 4). Lists, similar to Tracking Area lists may be used to identify the area in which a common SIB is valid. The per-cell dynamic SIB may be broadcast more often than the base SIB and may contain cell specific information and information that changes more often. For example, certain information elements (IE), such as cell IDs and value tags for the SIB itself, may be different for each cell and may be appropriately broadcast in the dynamic SIB. Other IEs may or may not be cell specific, such as access parameters (PRACH), max UE power, and handover configurations, and may be broadcast in the dynamic SIB, depending on operator configurations. Certain IEs, which are not cell specific, but can change relatively frequently, such as cell access and radio resource management (RRM) related parameters, may also be included in the dynamic SIB as it is important for UEs to get these IEs rapidly. However, as the dynamic SIBs are transmitted more frequently than current SIBs, it may be desirable to keep their size small to reduce the over air time and IEs that are not cell specific and change less frequently, such as eNB configuration parameters like the PLMN identity and band indicator are more appropriately broadcast in the common SIB. Information associated with initial cell acquisition is also more appropriately broadcast in the common SIB as latency is less of a concern for initial cell acquisition.

In some cases, a UE may cache the information common to an area of cells and quickly acquire dynamic SIBs as needed for cell reselection. With tiered transmissions of SIBs, a UE may also be configured to selectively cache neighbor cell information or system information for an entire network. In some cases, a validity timer with a value indicating a valid time period for information in the base SIB may be broadcast with the base SIB allowing for all or some of the information in the base SIB to be expired. This remaining time may be in TTIs or milliseconds.

Figure 5:
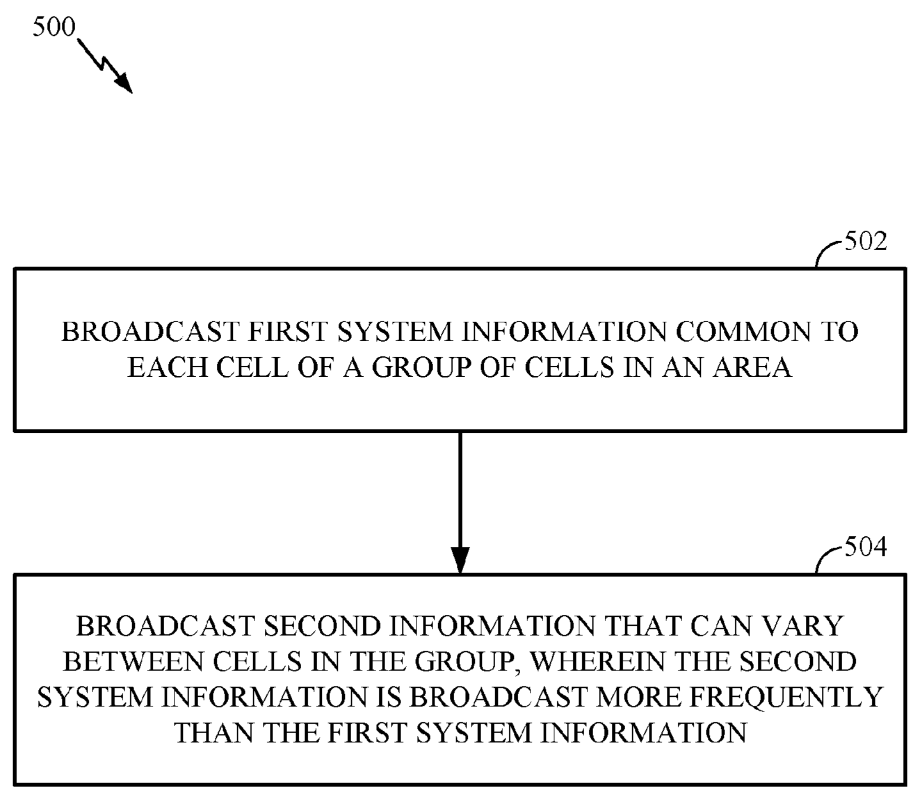
FIG. 5 illustrates example operations that may be performed by a base station for conveying system information in a tiered manner, in accordance with aspects of the present disclosure.

FIG. 5 illustrates example operations 500 that may be performed by a base station for conveying system information in a tiered manner, in accordance with aspects of the present disclosure. The operations 500 begin, at 502, by broadcasting a first system information common to each cell of a group of cells in an area (e.g., Common SIB). At 504, the base station broadcast a second system information that can vary between cells in the group (e.g., Dynamic SIB), wherein the second system information is broadcast more frequently than the first system information.

Figure 6:
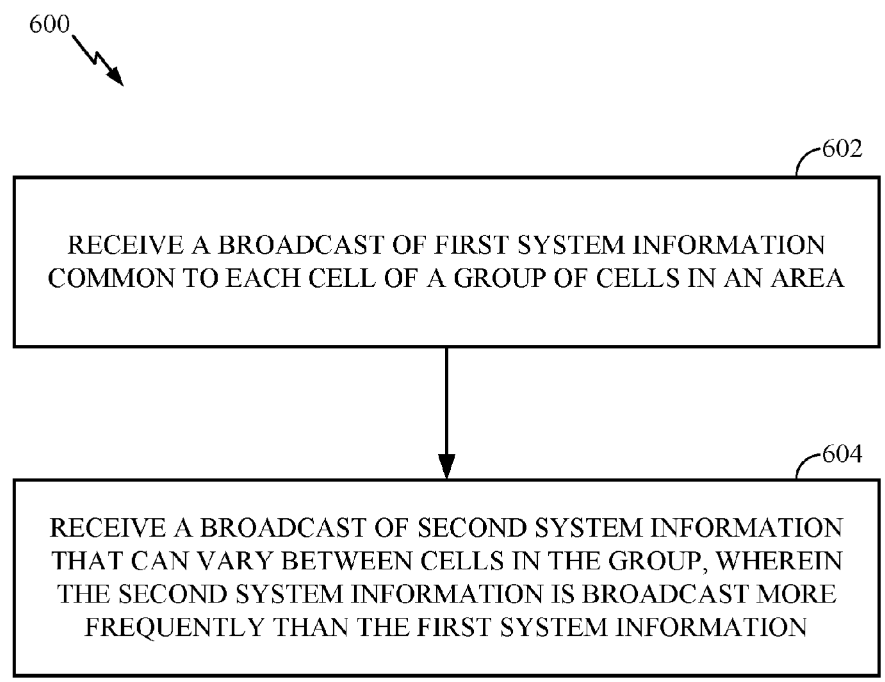
FIG. 6 illustrates example operations that may be performed by user equipment for receiving system information that is conveyed in a tiered manner, in accordance with aspects of the present disclosure.

FIG. 6 illustrates example operations 600 that may be performed by user equipment for obtaining system information conveyed in a tiered manner, in accordance with aspects of the present disclosure. In other words, the operations 600 may be considered UE-side operations complementary to the eNB-side operations 500 shown in FIG. 5.

The operations 600 begin, at 602, by receiving a broadcast of first system information common to each cell of a group of cells. At 604, the UE receives a second broadcast message comprising second system information that can vary between cells in the group, wherein the second system information is broadcast more frequently than the first system information.

Figure 7:
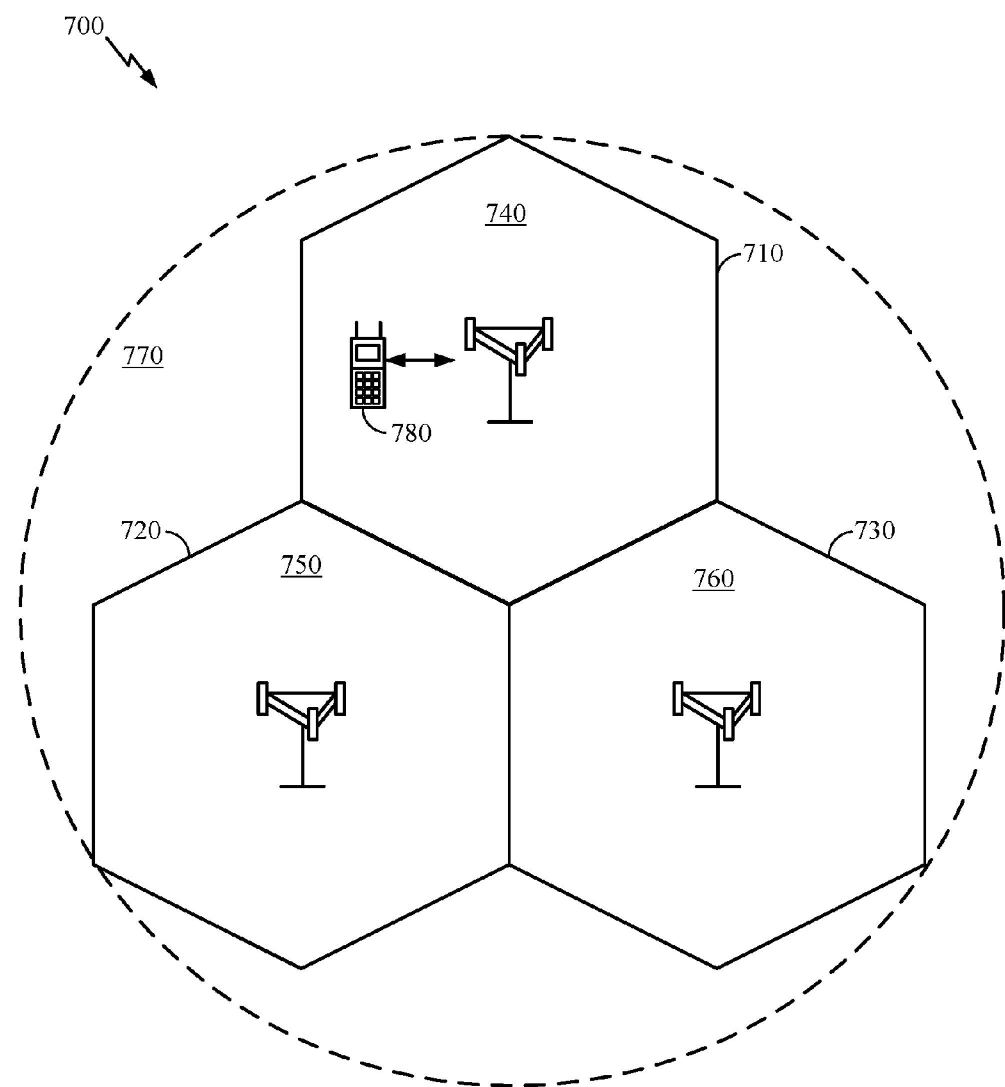
FIGS. 7 and 8 illustrate an example of tiered transmission of SIB, in accordance with aspects of the present disclosure.

FIG. 7 shows a block diagram conceptually illustrating a further example 700 of a tiered transmission of SIB messages. In the illustrated example, a group of cells (Cell 710, Cell 720, and Cell 730) in a common area 700 share a set of common system information (conveyed as Common SIB 770). In other words, Common SIB 770 may be broadcast by each cell in area 700. In some cases, Common SIB 770 may be multicast, for example, on a Physical Multicast Channel (PMCH) or similar shared synchronized channel to allow for greater diversity. As illustrated, the area 700 may cover a group of neighbor cells, similar to a Tracking Area (TA). However, conventional TAs may be too large, so a new type of area may be defined for a group of cells sharing a Common SIB.

Dynamic system information that may change between cells may be broadcast by each cell more frequently than the common system information. In the illustrated example, Cell 710, Cell 720, and Cell 730 may broadcast their respective Dynamic SIB (Dynamic SIB 740/750/760) more frequently than Common SIB 770. A UE 780 may complete system acquisition for Cell 710 after having obtained both Common SIB 770 and Dynamic SIB 740.

In certain aspects, while initial acquisition for a cell in area 700 may require UE 780 to wait for a broadcast of Common SIB 770, UE 780 may cache this information and use it to reduce acquisition time when moving to another cell within area 700.

Figure 8:
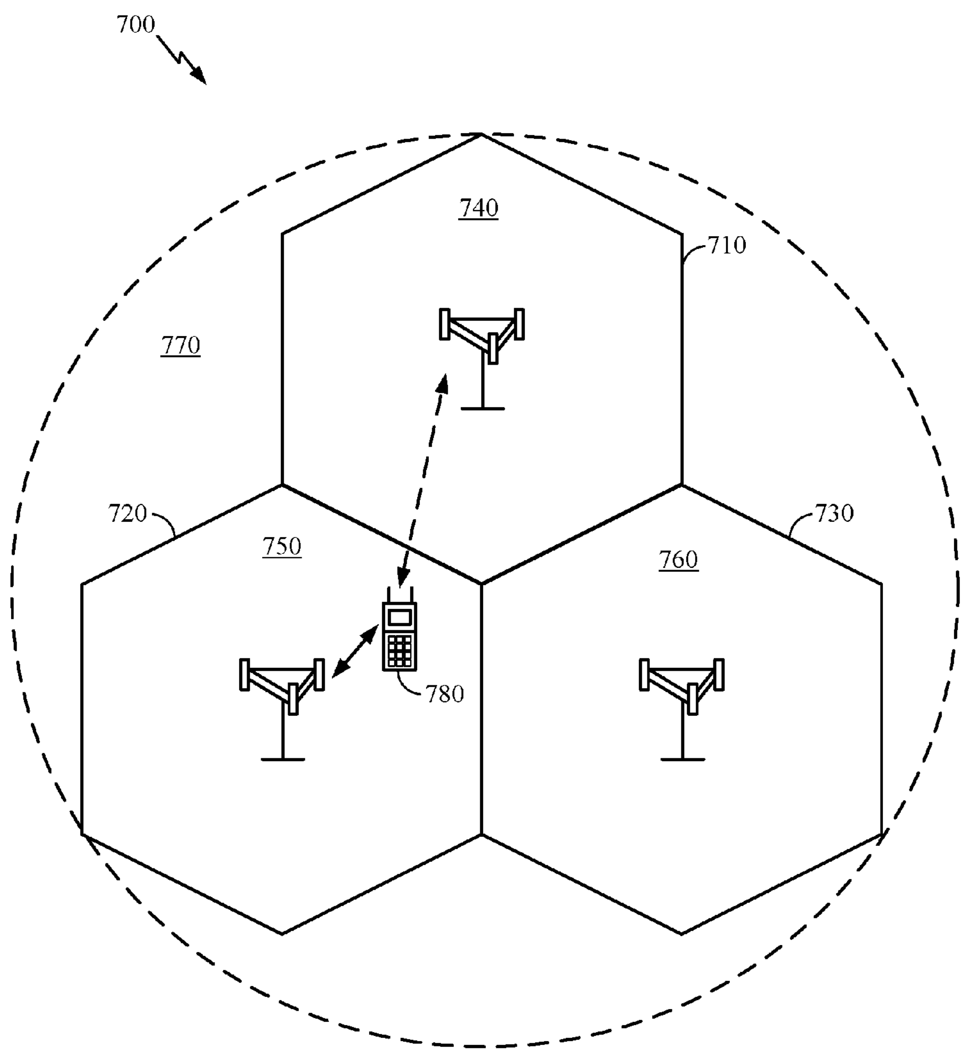

For example, as illustrated in FIG. 8, if UE 780 moves into Cell 720 from Cell 710, the UE 780 only needs to obtain Dynamic SIB 750 (broadcast in Cell 720), having already cached Common SIB 770. In certain aspects, the UE 780 may use cached information, for example, until a corresponding validity timer has expired or the UE 780 receives some other indication the system information has changed. In other words, UE 780 may only need to again obtain Common SIB information when that information has expired, has changed, or if the UE moves into another area with a different Common SIB.

Figure 9:
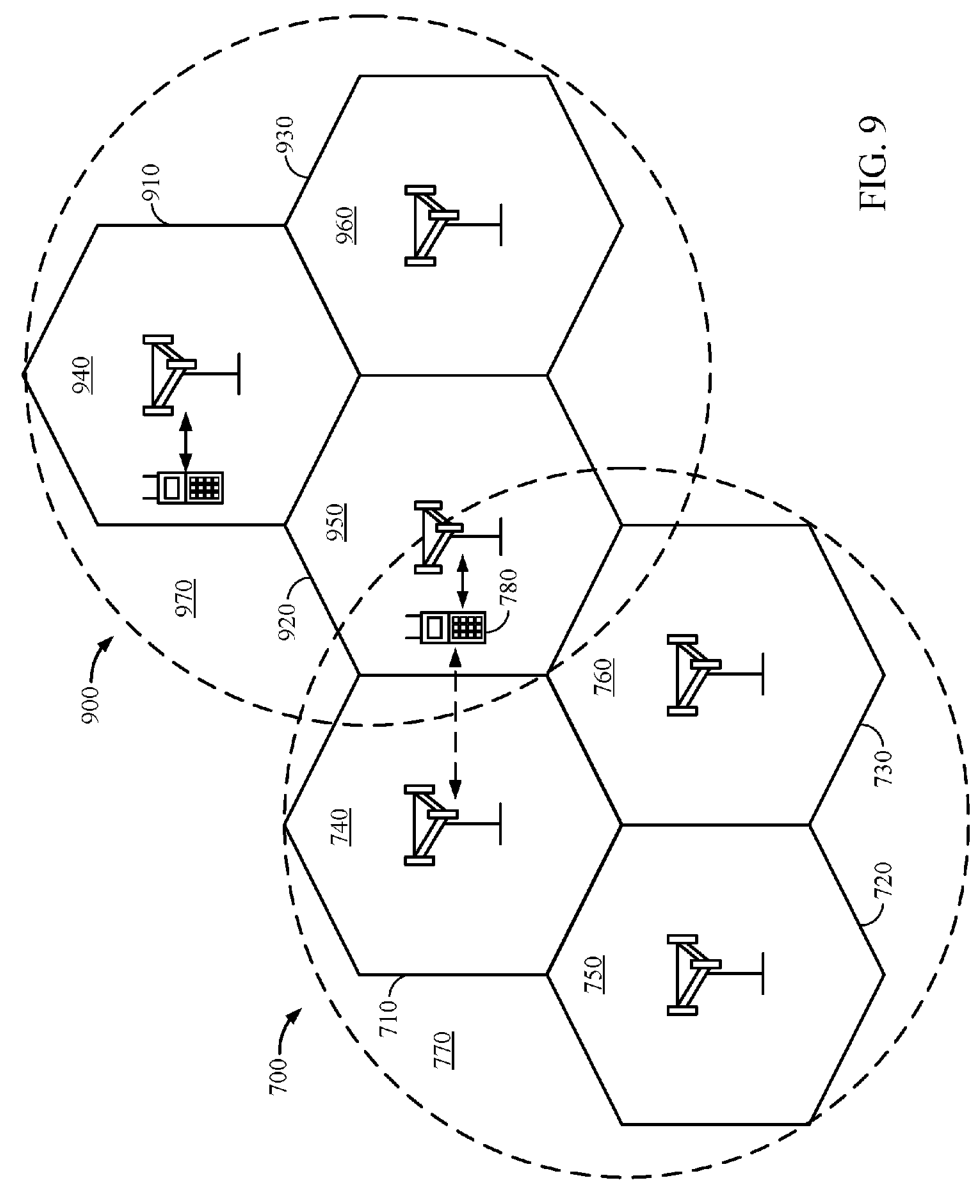
FIG. 9 illustrates another example of tiered transmission of SIB, in accordance with aspects of the present disclosure.

This latter example is illustrated in FIG. 9, where UE 780 moves from area 700 into a new area 900. In this case, UE 780 may need to obtain both the common system information for area 900 (Common SIB 970) and dynamic system information for the particular cell it has entered (Dynamic SIB 950 assuming it enters Cell 920) to complete system acquisition.

As described herein, tiered transmission of SIBs along with UE caching of SIB information may allow for the base SIB to be sent less often. However, a long period between base SIB broadcasts may slow initial cell acquisition where a UE does not already have a valid cached base SIB. In certain aspects, the UE may be preconfigured with network system information and query the network in order to acquire information from the common SIB. Where the base SIB changes prior to the expiration of the validity timer, paging via, for example, paging messages, may be used to inform UEs about the SIB changes. Pages may include a separate value tag for each tier, base or dynamic, SIB.

In certain aspects, reducing latency in cell access procedures may be achieved through the use of a reduced paging cycle. Paging enables a network to notify a UE that the network has information for the UE. A UE monitors for pages while in idle mode and may transition to connected mode upon reception of a relevant page. For example, legacy UEs and devices utilize a 320 ms paging cycle. According to certain aspects, a network may be configured to support a reduced paging cycle and a UE which supports the use of a reduced paging cycle may detect the network (e.g., via PSS/SSS) and then request the network use a reduced paging cycle. Alternatively, a determination to use a reduced paging cycle may be based on, for example, the type (and/or amount) of traffic between a base station and a UE, the network APN, or random access channel (RACH) procedure resource identifiers or preambles used by the UE.

Figure 10:
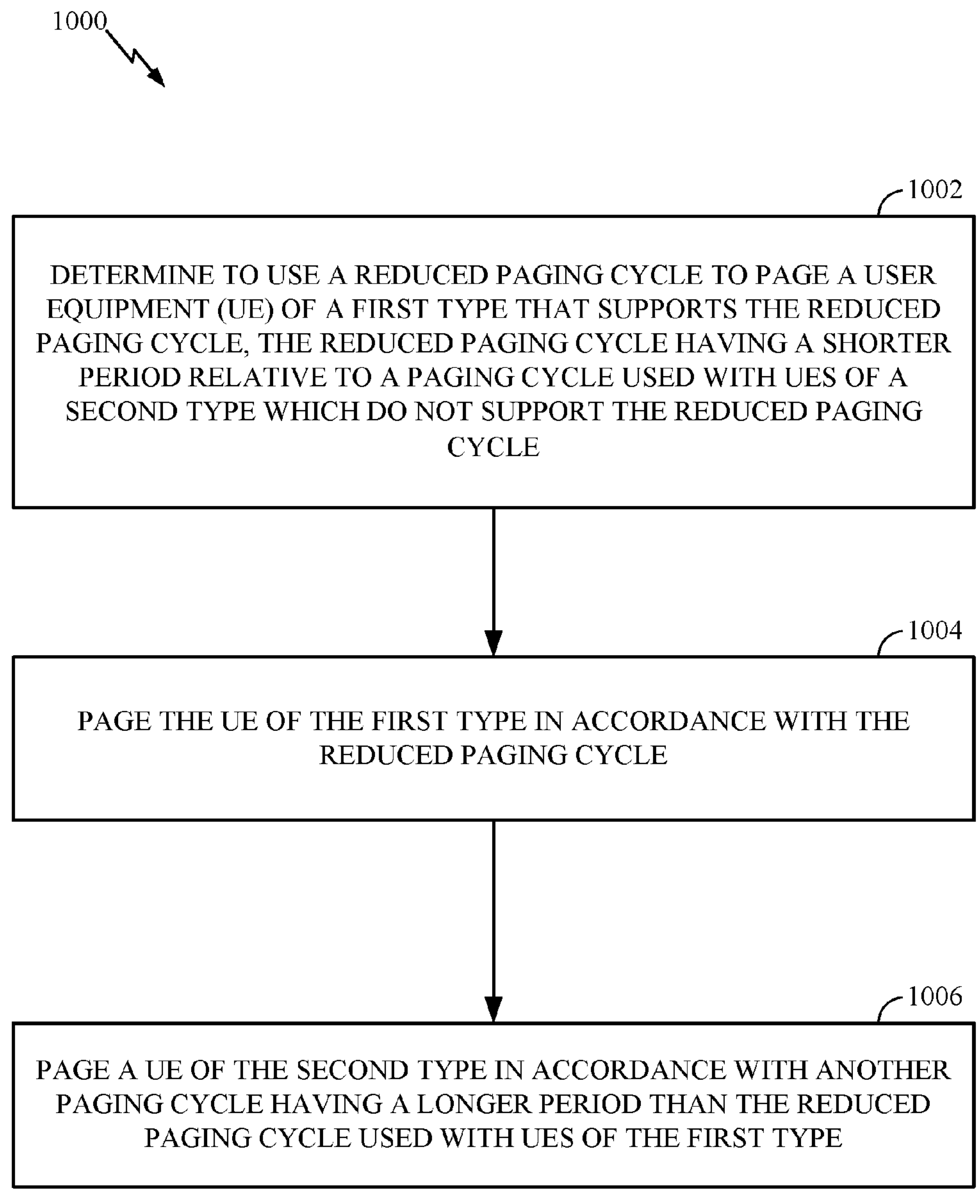
FIG. 10 illustrates example operations that may be performed by a base station for enhanced paging, in accordance with aspects of the present disclosure.

FIG. 10 illustrates example operations 1000 for paging with a reduced paging cycle, in accordance with aspects of the present disclosure. The operations 1000 may begin, at 1002 by determining to use a reduced paging cycle to page a user equipment (UE) of a first type that supports the reduced paging cycle, the reduced paging cycle having a shorter period relative to a paging cycle used with UEs of a second type which do not support the reduced paging cycle. At 1004, paging the UE in accordance with the reduced paging cycle. At 1006, paging a UE of the second type in accordance with another paging cycle having a longer period than the reduced paging cycle used with UEs of the first type.

Figure 11:
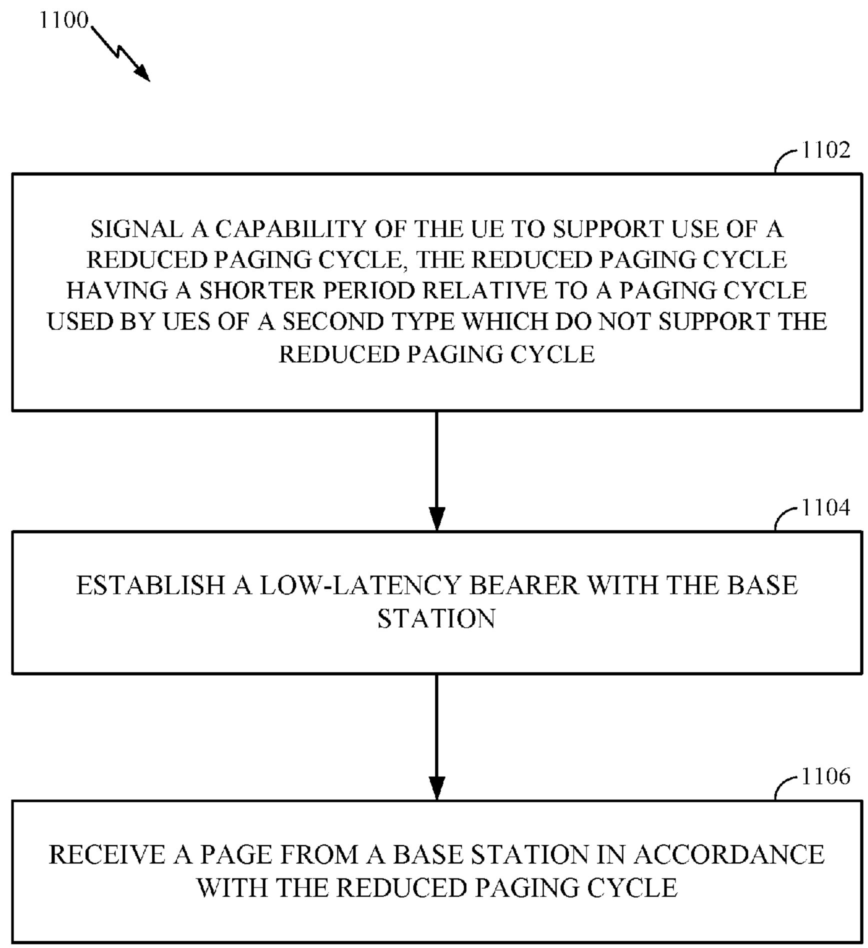
FIG. 11 illustrates example operations that may be performed by user equipment for enhanced paging, in accordance with aspects of the present disclosure.

FIG. 11 illustrates example operations 1100 that may be performed by user equipment for monitoring for paging with a reduced paging cycle, in accordance with aspects of the present disclosure. In other words, the operations 1100 may be considered UE-side operations complementary to the eNB-side operations 1000 shown in FIG. 10.

The operations 1100 may begin, at 1112 by signaling a capability of the UE to support use of a reduced paging cycle, the reduced paging cycle having a shorter period relative to a paging cycle used by UEs of a second type which do not support the reduced paging cycle. At 1104, the user equipment establishes a low-latency bearer with the base station. At 1106, the user equipment receives a page from a base station in accordance with the reduced paging cycle.

In some cases, in order to maintain backward compatibility with legacy devices and still allow for low-latency traffic, a shorter paging cycle may be enabled based on UE or application. For example, a network element, such as a mobility management entity (MME), may determine or decide to use a shorter paging cycle based on the UE identity or a UE request for a shorter paging cycle. As another example, a UE may indicate its capability for supporting the shorter paging cycle by, for example, in an UE capability information element (IE). A UE may also request a shorter paging cycle via a non-access stratus (NAS) protocol when the UE has low-latency traffic or when the UE has the resources to monitor a shorter paging cycle, for example, when battery life is not an issue.

In some cases, the MME, or other network element, may retain a history of UE activity, request, or traffic and decide to use a shorter paging cycle based on this history. This decision may be made per bearer in connected mode, for example, on establishment of a low-latency bearer, or when the network expects low-latency activity on the bearer. The decision to use a shorter paging cycle may also be based on whether a certain access point name (APN) is active (i.e., a bearer belonging to the APN is established) where the APN is associated with lower latency operations and a shorter paging cycle may be assumed. One or more parameters, such as RACH resource identifiers and/or an identifier for PUSCH parameters (e.g., identifying resource blocks to use for PUSCH) may also be included during paging to enable a faster transition to connected mode (e.g., by avoiding contention).

The various operations of methods described above may be performed by any suitable means capable of performing the corresponding functions. The means may include various hardware and/or software component(s) and/or module(s), including, but not limited to a circuit, an application specific integrated circuit (ASIC), or processor.

Means for obtaining (e.g., receiving) may comprise a receiver (e.g., the demodulator 332 and 354) and/or an antenna(s) 334 and 352 depicted in FIG. 3. Means for transmitting, means for broadcasting, means for outputting, and means for paging may comprise a transmitter (e.g., the modulator 332 and 354) and/or an antenna(s) 334 and 352 depicted in FIG. 3.

Means for generating, means for detecting, means for determining, means for obtaining, means for selecting, means for adjusting, means for processing, means for caching, means for utilizing, means for broadcasting, means for establishing, means for signaling, and/or means for providing may include a processing system, which may include one or more processors such as processors 320, 340, 338, 358, 380, and 364 portrayed in FIG. 3

In some cases, rather than actually transmitting a frame a device may have an interface to output a frame for transmission. For example, a processor may output a frame, via a bus interface, to a radio frequency (RF) front end for transmission. Similarly, rather than actually receiving a frame, a device may have an interface to obtain a frame received from another device. For example, a processor may obtain (or receive) a frame, via a bus interface, from an RF front end for reception.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:

determining to use a reduced paging cycle to page a user equipment (UE) of a first type that supports the reduced paging cycle based, at least in part, on a history of traffic of the UE of the first type, establishment of a low-latency bearer, and one or more access point names (APNs) being active, the reduced paging cycle having a shorter period relative to a paging cycle used with UEs of a second type which do not support the reduced paging cycle; and paging the UE of the first type in accordance with the reduced paging cycle, wherein the paging includes at least one page comprising one or more parameters for the UE of the first type to use for uplink transmissions on a physical uplink shared channel (PUSCH).

2. The method of claim 1, further comprising:

paging a UE of the second type in accordance with another paging cycle having a longer period than the reduced paging cycle used with UEs of the first type.

3. The method of claim 1, wherein determining to use the reduced paging cycle is performed by a mobility management entity (MME).

4. The method of claim 1, further comprising determining the UE of the first type is capable of supporting the reduced paging cycle based on UE capability information.

5. The method of claim 1, further comprising:

receiving a request from the UE of the first type to use the reduced paging cycle, and wherein determining to use the reduced paging cycle is based, at least in part, on the request.

6. The method of claim 1, further comprising:

determining an identity of the UE of the first type, and wherein determining to use the reduced paging cycle is based, at least in part, on the identity.

7. The method of claim 1, wherein at least one other page comprises a Random Access Channel (RACH) resource identifier for the UE of the first type to use when performing a RACH procedure.

8. A method of wireless communication by a user equipment (UE), comprising:

signaling a capability of the UE to support use of a reduced paging cycle, at least in part, by establishing a low-latency bearer with a base station and transmitting, to the base station, on one or more bearers belonging to one or more access point names (APNs) associated with the reduced paging cycle, the reduced paging cycle having a shorter period relative to a paging cycle used by UEs of a second type which do not support the reduced paging cycle; and receiving one or more pages from the base station in accordance with the reduced paging cycle based on a history of traffic of the UE, wherein at least one of the received one or more pages comprises one or more parameters for the UE of the first type to use for uplink transmissions on a physical uplink shared channel (PUSCH).

9. The method of claim 8, wherein signaling the capability of the UE to support use of the reduced paging cycle further comprises, at least in part, transmitting, to the base station, UE capability information indicating support for the reduced paging cycle.

10. The method of claim 8, wherein signaling the capability of the UE to support use of the reduced paging cycle further comprises, at least in part, transmitting, to the base station, a request to use the reduced paging cycle.

11. The method of claim 8, wherein signaling the capability of the UE to support use of the reduced paging cycle further comprises, at least in part, transmitting, to the base station, an identifier of the UE.

12. The method of claim 8, wherein at least another one of the one or more pages includes a Random Access Channel (RACH) resource identifier for the UE to use when performing a RACH procedure.

13. An apparatus for wireless communications, comprising at least one processor and a memory coupled to the at least one processor with instructions stored thereon, wherein:

the at least one processor is configured to:

determine to use a reduced paging cycle to page a user equipment (UE) of a first type that supports the reduced paging cycle based, at least in part, on a history of traffic of the UE of the first type, establishment of a low-latency bearer, and one or more access points names (APNs) being active, the reduced paging cycle having a shorter period relative to a paging cycle used with UEs of a second type which do not support the reduced paging cycle; and page the UE of the first type in accordance with the reduced paging cycle, wherein at least one page comprises one or more parameters for the UE of the first type to use for uplink transmissions on a physical uplink shared channel (PUSCH).

14. The apparatus of claim 13, wherein the at least one processor is further configured to page a UE of the second type in accordance with another paging cycle having a longer period than the reduced paging cycle used with UEs of the first type.

15. The apparatus of claim 13, wherein determining to use the reduced paging cycle is performed by a mobility management entity (MME).

16. The apparatus of claim 13, wherein the at least one processor is further configured to determine the UE of the first type is capable of supporting the reduced paging cycle based on UE capability information.

17. The apparatus of claim 13, wherein the at least one processor is further configured to receive a request from the UE of the first type to use the reduced paging cycle, and wherein determining to use the reduced paging cycle is based, at least in part, on the request.

18. An apparatus for wireless communication by a user equipment (UE), comprising at least one processor and a memory coupled to the at least one processor with instructions stored thereon, wherein:

the at least one processor is configured to:

signal a capability of the UE to support use of a reduced paging cycle, at least in part, by establishing a low-latency bearer with a base station and transmitting, to the base station, on one or more bearers belonging to one or more access point names (APNs) associated with the reduced paging cycle, the reduced paging cycle having a shorter period relative to a paging cycle used by UEs of a second type which do not support the reduced paging cycle, and receive one or more pages from the base station in accordance with the reduced paging cycle based on a history of traffic of the UE, wherein at least one of the one or more pages comprises one or more parameters for the UE of the first type to use for uplink transmissions on a physical uplink shared channel (PUSCH).

19. The apparatus of claim 18, wherein the at least one processor is configured to signal the capability of the UE to support use of the reduced paging cycle, at least in part, by transmitting, to the base station, UE capability information indicating support for the reduced paging cycle.

20. The apparatus of claim 18, wherein the at least one processor is configured to signal the capability of the UE to support use of the reduced paging cycle, at least in part, by transmitting, to the base station, a request to use the reduced paging cycle.

21. The apparatus of claim 18, wherein the at least one processor is configured to signal the capability of the UE to support use of the reduced paging cycle, at least in part, by transmitting, to the base station, an identifier of the UE.

* * * * *